United States Patent [19]

Campas

[11] Patent Number: 5,440,386
[45] Date of Patent: Aug. 8, 1995

[54] METHOD AND DEVICE FOR CALIBRATING AN APPARATUS FOR MEASURING THE THICKNESS OF A SHEET OF MATERIAL

[75] Inventor: Jean-Jacques Campas, Colligny, France

[73] Assignee: Sollac (Societe anonyme), Puteaux, France

[21] Appl. No.: 228,346

[22] Filed: Apr. 15, 1994

[30] Foreign Application Priority Data

Apr. 26, 1993 [FR] France .................. 93 05053

[51] Int. Cl.⁶ .................................. G01J 1/02
[52] U.S. Cl. ...................................... 356/243
[58] Field of Search ............... 356/381, 382, 243

[56] References Cited

U.S. PATENT DOCUMENTS 3,942,899 3/1976 Loughenry ............... 356/243

FOREIGN PATENT DOCUMENTS

| 2578643 | 3/1985 | France . | |
|---|---|---|---|
| 58-47223 | 3/1983 | Japan | 356/243 |
| 59-054913 | 3/1984 | Japan . | |
| 4-125427 | 4/1992 | Japan | 356/243 |
| 1369469 | 9/1988 | U.S.S.R. | 356/243 |

Primary Examiner—Richard A. Rosenberger
Assistant Examiner—Jason D. Eisenberg
Attorney, Agent, or Firm—Sixbey, Friedman, Leedom & Ferguson

[57] ABSTRACT

The device of the invention calibrates an apparatus for measuring the thickness profile of flat products, for example metal sheets, of the type which includes a source (10) of radiation, for example an X-ray source, and a row (20) of elementary detectors (21) which are aligned along the direction (P) of the profile to be measured and are placed on either side of a zone (2) for passage of said product. The device includes a set (32) of shims (33) having different radiation absorption characteristics, a carriage (30) for supporting the shims which is movable along the direction (P). For the calibration, the set of shims is moved in the passage zone so that each shim may intercept the radiation emitted by the source in the direction of each detector. During the movement of the carriage, a plurality of readings of the signals emitted by the detectors are taken so as to obtain, for each detector, a set of values of the signals representing the intensity of the radiation absorbed by each shim, and the calibration curve of each sensor is established on the basis of these values.

10 Claims, 2 Drawing Sheets

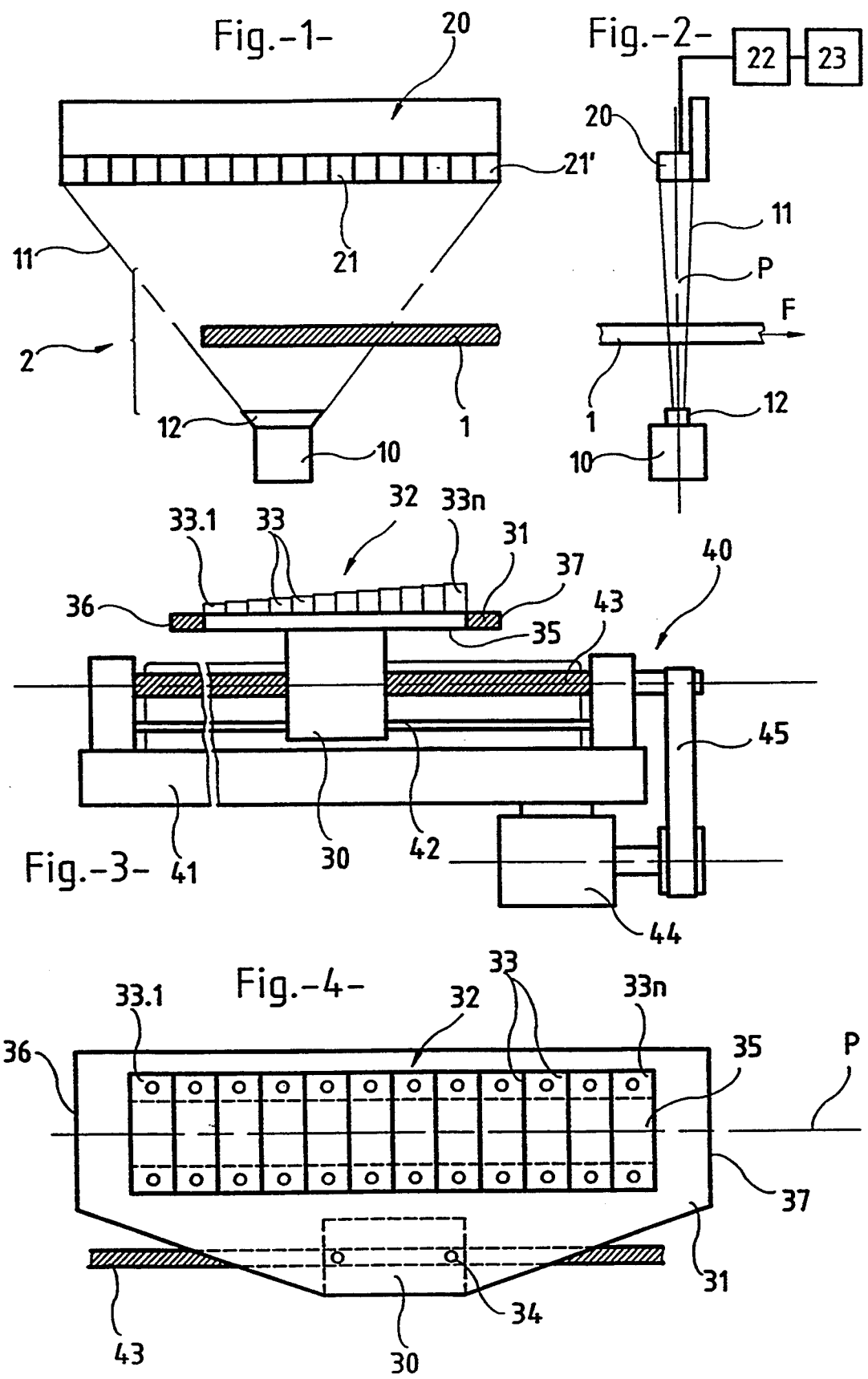

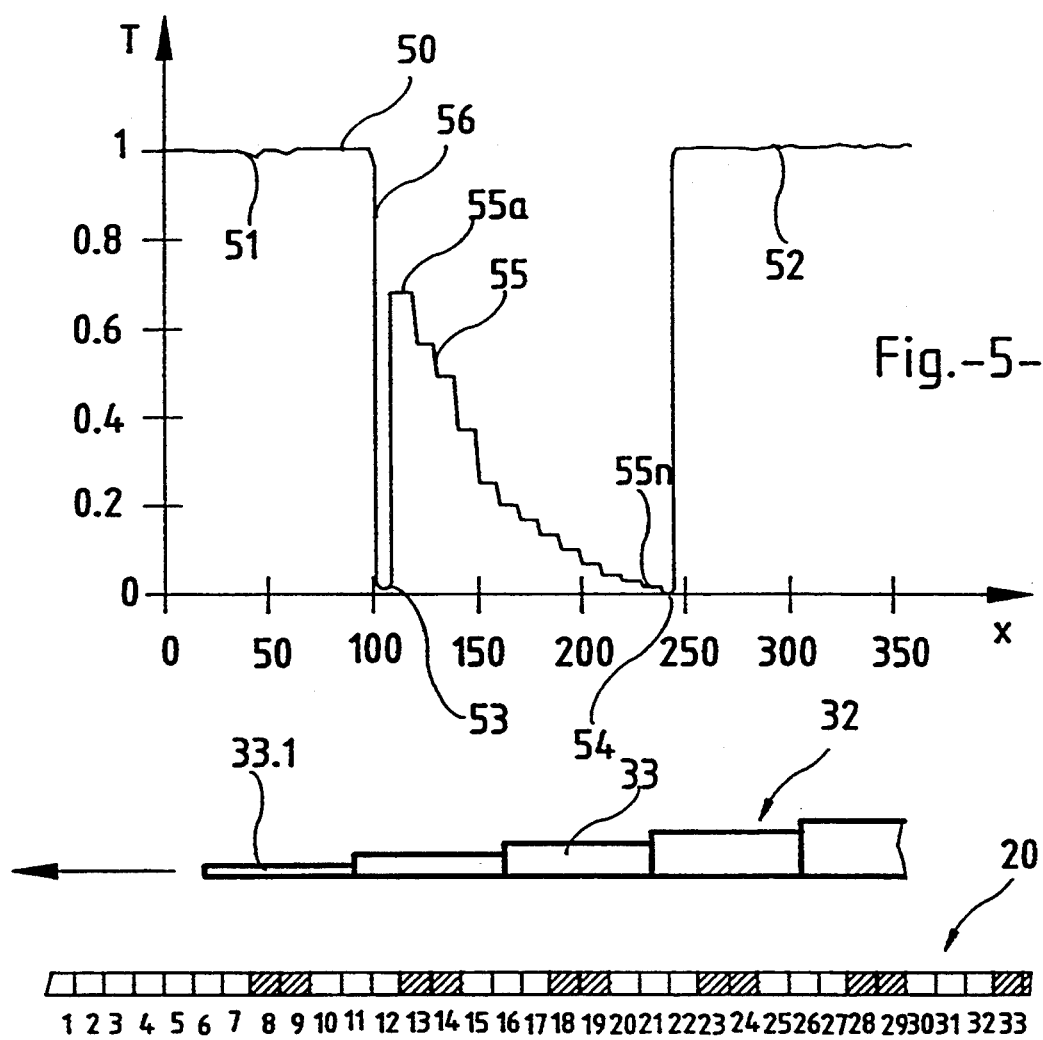
Fig.-5-
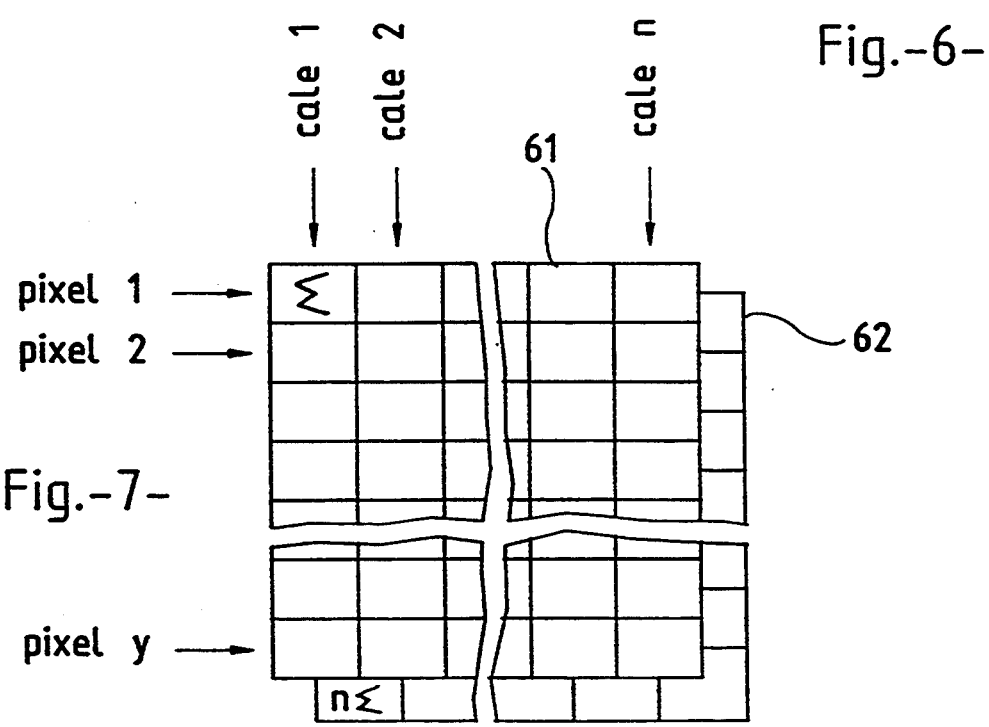
Fig.-6-
Fig.-7-

METHOD AND DEVICE FOR CALIBRATING AN APPARATUS FOR MEASURING THE THICKNESS OF A SHEET OF MATERIAL

FIELD OF THE INVENTION

The present invention relates to a calibration method and device for an assembly for measuring the transverse thickness profile of a flat product, such as a metal sheet.

PRIOR ART

A measurement assembly of this type, described for example in the document FR-A-2,578,643, includes a source of radiation, for example an X-ray source, located on one side of the product and at least one row of juxtaposed elementary detectors, which extend along the direction of the profile to be measured, on the other side of the product.

The measurement is based on the absorption of the radiation by the product, which varies especially as a function of the thickness of the latter. Each elementary detector receives the part of the flux emitted by the source and not absorbed by the product. The function linking the signal supplied by each detector in response to the flux which it receives is an exponential law, one of the parameters of which is the nature of the constituent material of the product.

It is therefore necessary to calibrate, the measurement assembly.

It is known to calibrate thickness-measurement systems operating on the principle of the absorption of radiation by successively inserting into the beam, between source and detector, shims of known thickness and composition, and by modeling the response by a polynomial of order n (generally of the 5th order). The shims used have to have an accurately known thickness and a very high thickness uniformity over the surface traversed by the beam.

In point thickness-measurement systems using a source and a single detector, shim magazines are used placed right up against the source, as close as possible to the exit of the beam, there where its diameter is a minimum. Arms enable shims to be placed individually or simultaneously into the beam. The thickness of these shims corresponds to a binary progression or BCD so as to cover the measurement range by minimizing the number thereof. The shims are approximately 15 mm in diameter.

In the case of an assembly for measuring the thickness profile comprising a plurality of elementary detectors, each of these detectors has to be calibrated. However, such assemblies may include several hundreds of aligned detectors extending over several hundreds of millimeters.

Given that the calibration of a detector requires at least ten points, that is to say the use of different shims creating at least ten thicknesses, it may be easily understood that the successive calibration of each of the elementary detectors is virtually impossible since it would lead to making thousands of measurements, and therefore thousands of manipulations of the shims, for the complete calibration of the system.

Another possibility consists in using standard shims enabling all the detectors to be calibrated simultaneously. If these shims are placed just above-the row of detectors, the measurement zone is very elongated because of the great length of this row. When a stationary source emitting the radiation in a widened fan-like beam is used to cover all the detectors, it would be possible to place the standard shims in the proximity of the source, where the width of the beam is least. However, in practice, the shims can be placed as close as possible to the source only in a zone where the width of the beam is already close to 100 mm. Such a method therefore involves using very long shims, the thickness uniformity of which cannot be ensured over their entire length, which falsifies the calibration.

The problem is therefore to reduce the time necessary for an accurate and rapid calibration of an assembly for measuring the thickness profile of a product, which includes numerous detectors juxtaposed along an elongated row, without having to use calibration shims whose large dimensions turn out to be incompatible with the accuracy required for their thickness.

SUMMARY OF THE INVENTION

The subject of the invention is therefore a method of calibrating an assembly for measuring the transverse thickness profile of a flat product, including a source of radiation, placed on one side of the product, and a row of elementary detectors which are juxtaposed and aligned along the direction of the profile to be measured and are placed on the other side of the product, in order to detect that part of the radiation not absorbed by the product, which method is of the type consisting in interposing, between the source and the detectors, standard shims and in determining the response of said detectors as a function of the characteristics of these shims, this method enabling all the detectors to be rapidly-and accurately calibrated.

According to the invention, this method is one wherein a set of different unitary shims, of small dimensions, aligned along said direction, are moved, between the source and the detectors, along said direction, each shim having predetermined specific characteristics, especially relating to its material and to its thickness, this movement being produced so that, while the latter is proceeding, each shim intercepts the radiation picked up by each detector, and, while it is moving, a plurality of readings of the signals emitted by the detectors is taken so as to obtain, for each detector, a set of values of the signals representing the intensity of the radiation absorbed by each shim, both the speed of movement of the set of shims and the frequency of the readings being adjusted so that, for each detector, there is at least one reading of the signals relating to each shim and the calibration curve of each detector is established on the basis of said values.

Thus, the calibration of an assembly for measuring the transverse thickness profile of a flat product, including a row of numerous unitary detectors, may be carried out rapidly, in a single pass of the set of shims between the source and the detectors, and very accurately, since each shim is of small dimension and may therefore have a thickness which is well controlled and constant over its entire surface.

Preferentially, both the speed of movement of the set of shims and the frequency of the readings are determined so that, for each detector, there is a plurality of readings of the signals relating to the same shim. Thus, the overall accuracy of the calibration is increased by using, for each sensor, the results of a plurality of measurements made on the same shim, and therefore for the same thickness, but at a plurality of points thereof.

Moreover, the position of the set of shims with respect to the row of detectors is preferentially determined, at the time of each reading, on the basis of the signals-read from the set of detectors. Although the position of the set of shims could be determined by direct measurement of its movement, or on the basis of the measurement of its speed of movement and of the time elapsed from the start of the movement, the previous arrangement guarantees accurate determination of the location of the shims with respect to the detectors at the time of each reading, thus enabling a value of the signal supplied by a detector to be linked directly to the corresponding shim. Thus, the movement of the shims may be carried out without bothering about synchronism with the readings and about position recopying.

In particular, the position of the set of shims is determined by the position, within the row of detectors, of neighboring detectors which, during a reading, supply highly differentiated signals resulting from an abrupt transition in the absorption of the radiation between a defined element of the set of shims, or of a support for this set, and the neighborhood of this element. For example, said abrupt transition is produced by the free edge of a frame for supporting the shims which strongly absorbs the radiation, whereas, beyond this edge, the radiation reaches the detectors in its entirety.

Still more preferentially, during each reading, only the signals which reach the detectors located, during this reading, facing the central part of the shims are employed. All the measurements which would correspond to a transition zone between two shims are thus systematically eliminated. The measurements carried out by the detectors located facing the edge of the shims, in the direction of the part of the radiation in question, are not used since they are tainted with error. The location of the detectors in question may be easily determined on the basis of the location of the set of shims with respect to the row of detectors and of the dimensions of the latter and of their position within the set of shims.

The subject of the invention is also a device for calibrating an assembly for measuring the thickness profile of flat products, which includes a source of radiation and a row of elementary detectors which are juxtaposed and aligned along the direction of the profile to be measured, both the source and the row of detectors being placed on either side of a zone for passage-of said product, the device being one which includes a set of different shims aligned along said direction, a carriage for supporting the shims, which is movable along this direction in order to move the set of shims into the passage zone so that each shim can intercept the radiation emitted by the source toward each detector, and means for taking, while the carriage is moving, a plurality of readings of the signals emitted by the detectors so as to obtain, for each detector, a set of values of the signals representing the intensity of the radiation absorbed by each shim, and means for determining the calibration curve of each sensor on the basis of these values.

Preferentially, the shims are supported by the carriage by means of a frame to which the shims are attached in a contiguous manner, the frame having a sufficient thickness so that the edge of this frame can serve as a reference for the determination of the position of the shims with respect to the detectors, creating an abrupt variation in the intensity of the radiation reaching respectively the detectors located facing this frame and the detectors located beyond the edge of the frame, the radiation reaching these in its entirety.

Other characteristics and advantages will appear in the description which will be given by way of example of a device and a method for calibrating an assembly for continuous measurement of the edgewise thickness profile of steel strips.

BRIEF DESCRIPTION OF THE DRAWING

Reference will now be made to the appended drawings in which:

FIG. 1 is a diagrammatic view of the thickness profile measurement assembly;

FIG. 2 is a side view of the measurement assembly of FIG. 1;

FIG. 3 is a view of the mechanical means of the device according to the invention;

FIG. 4 is a view from above of the set of calibration shims and of its support;

FIG. 5 is a graphical representation of the signals supplied by the set of detectors during a reading;

FIG. 6 shows the principle for selecting the detectors, the signals of which are taken into account during each reading;

FIG. 7 shows the structure of the data-acquisition tables corresponding to the signals supplied by the detectors.

DESCRIPTION OF THE PREFERRED EMBODIMENTS

The assembly for measuring the thickness profile, shown in FIGS. 1 and 2, includes a source 10 of ionizing radiation which is capable of passing through a flat product, such as the strip 1, while being partially absorbed by the latter, the absorption varying as a function of its thickness, and a row 20 of juxtaposed elementary detectors 21 which is placed on the other side of the strip 1. The measurement of the profile is carried out continuously while the strip runs along the arrow F.

The source 10 is provided with a collimator 12 which supplies a flat fan-like beam 11, in a plane perpendicular to the arrow F, and which therefore extends along the general direction of the row 20 of detectors.

Such a measurement assembly is described in the document FR-A-2,578,643 already mentioned, and to which it will be possible to refer for more details on its use for the measurement of the thickness profile. It is only recalled here that the flux of radiation emitted by the source toward an elementary detector 21 is partially absorbed by the strip 1. The non-absorbed flux reaching the detector 21 is therefore a function of the composition of the strip and, most especially, for this is of interest to us here, of its thickness. The signal emitted by the detector 21 in response to this flux therefore enables, after calibration, the thickness of the strip to be determined in that zone of the latter through which the corresponding radiation passes. The combination of the signals supplied by the set of detectors therefore makes it possible to establish a thickness profile of that zone of the strip exposed to the radiation.

By way of example in such an assembly, the collimated beam has, at the source exit, a width of 60 to 80 mm, and the row of detectors includes 384 elementary detectors and extends over 600 mm. The overall signal supplied by the row of detectors representing the measured profile is therefore constituted by 384 pixels, each pixel corresponding to the signal supplied by one elementary detector.

The calibration device includes (FIG. 3) a movable carriage 30 which carries a frame 31 to which a set 32 of shims 33 of various thicknesses is attached, and a mechanism 40 for driving the carriage translationally. This drive mechanism includes a chassis 41, a slideway 42 for guiding the carriage and a drive screw 43 driven rotationally by a motor 44 and a belt 45.

During the calibration, this device is placed in the zone 2 for passage of the product, in such a way that the set of shims 33 extends in the plane P of the beam parallel to the general direction of the row of detectors, and in such a way that it can be moved as a whole over the entire width of the beam.

As may be seen in FIG. 4, the frame 31 is attached to the carriage 30, for example by screws 34, so that the mechanism 40 for driving the carriage is offset with respect to the plane P.

In the case of the example mentioned hereinabove, the frame has a length of approximately 150 mm, less than the width of the beam in the region of the strip 1, in which region said frame is placed for calibration.

As will be seen subsequently, this enables the position of the set of shims with respect to the detectors to be determined on the basis of the detection of the edges of the frame.

The set 32 of shims is constituted by a plurality of shims 33, for example twelve, of small width, for example from 10 to 20 mm, which are arranged contiguously and are aligned parallel to the direction of the row 20 of detectors. The shims are attached to the frame 31 so as to wholly cover the hollowed-out central zone 35 of the frame.

The device also includes means 22 for processing the signals supplied by the detectors while the carriage is moving, these means generally being both used while the assembly is being operated for the measurement of the profile, and calculating means 23 for determining the calibration curve of the sensors.

The operation of the device for calibration of the profile measurement assembly will now be described.

At the start of the calibration, the carriage 30 is located at one of the ends of its path, for example on the side where the motor 44 is, so that the frame 31 does not intercept the beam 11 of radiation. The movement is then initiated. When the edge 36 of the frame penetrates into the beam, the radiation directed toward the first detector 21' of the row 20 of detectors is strongly absorbed by the frame and the flux reaching this detector 21' is a minimum, whereas the radiation reaches, in its entirety, the neighboring detector. The corresponding signal 50 supplied by the set of detectors therefore includes an abrupt discontinuity, such as the one shown at 56 in FIG. 5.

While the movement is continuing, the same discontinuity will successively appear for the following detectors. It is this abrupt variation in the signal which enables the location of the frame 31, and therefore of the shims 33, to be defined, during each reading of the signals supplied by the set of detectors, without it being necessary to synchronize the movement of the carriage with the readers.

However, the speed of movement is determined so that each detector 21 can take a plurality of readings, for example from 4 to 8, on each of the shims 33.

As indicated hereinabove, at each reading, the position of the carriage, and therefore of the shims, is determined by analyzing the shape of the overall signal 50 supplied by the set of detectors (FIG. 5). The very thick frame 31 creates a significant contrast so as to endow this process with a sense of reliability. However, the position reference could be determined by another abrupt transition in the transmission factor of the flux, for example one caused by the edge of the thickest shim, or the transition between the thinnest shim and the frame, which is markedly thicker than the latter.

The drawing of FIG. 5 shows the signal 50 supplied by the set of detectors, during a reading, when the frame and the set of shims lies wholly within the field of the beam 11. The curve 50 shows the transmission factor T of the flux received by the detectors as a function of the abscissa x of the detectors.

The zones 51 and 52 correspond to the detectors which receive, in its entirety, the flux of radiation which passes on either side of the frame 31. The zones 53 and 54 correspond respectively to the detectors located, along the direction of the radiation, below the frame which virtually completely absorbs the flux, and the central zone 55 corresponds to the detectors which receive the radiation passing through the shims. This zone 55 has a "staircase" profile due to the various thicknesses of the shims 33, the "step" 55a corresponding to the least thick shim 33.1 and the step 55n corresponding to the thickest shim 33n.

In the transition zones between two consecutive steps, the signal is less well defined for the detectors in question.

In order to avoid subsequently taking into account, in establishing the calibration curves, the signals emitted by the detectors which lie facing the edges of the shims or the interface between two shims, only the signals emitted by the detectors corresponding to the central part of each shim are taken into consideration during each reading.

Thus, at each reading of the detectors, a few elementary detectors are selected for each shim, not taking into account the value of the signal emitted by the other detectors which receive a flux of radiation having passed through the shims in the proximity of their edges. This is what is shown diagrammatically in FIG. 6, where the elementary detectors whose signal is taken into account are shown darkened. The selection of these detectors is made on the basis of the determination of the position of the set of shims, as indicated previously, and of the measurement made beforehand of the distance between the edges of each shim and the position reference of the carriage, that is to say, here, the edge 36 of the frame 31.

As will be easily understood, on condition that the speed of movement of the carriage is sufficiently slow with respect to the rate of reading the detectors, each elementary detector, at the end of the calibration cycle, will have made a plurality of measurements on each of the shims.

Moreover, in order to determine the position of the shims with respect to the detectors throughout the movement of the carriage, provision is made to replace, at a certain time, for example at mid-travel, the position reference constituted by the front edge 36 of the frame with the rear edge 37 of the frame, so as to preserve a reference when, at the end of travel, the front edge lies outside the beam 11.

The processing of the signals is performed in the calculating machine 23 in the following manner, shown diagrammatically by the drawing in FIG. 7. The values of the signals emitted by each detector 21 are placed in two tables 61, 62 having as dimensions the number "Y"

of detectors and the number "n" of shims. For example, for a row of detectors of 384 elementary detectors, or pixels, and a calibration performed with 12 shims, the tables will have 384 lines and 12 columns.

At the start of the operation, the tables are zeroed. A table 61 receives the summations of values of the signals taken into consideration, and the other table 62 correspondingly receives the number of summations, that is to say the number of said values taken into consideration.

At each reading of the set of detectors, and for each pixel taken into consideration, the value of the latter is added in the corresponding box, defined by the number of the pixel and that of the shim having produced said value, in the table 61, and the box having the same coordinates in the table 62 is incremented, totalizing the number of values inserted into the corresponding box of the table 61.

Thus, at the end of the calibration cycle, all the boxes of the table 61 contain totalized values, and the averages of each of these boxes are calculated with the aid of the numbers of values of the table 62.

Next, for each of the lines, corresponding to the same detector, a polynomial representing the calibration curve is calculated with the aid of the average values of each of the boxes, these relating to each of the shims.

The invention is not limited to the device described hereinabove by way of example. It will be possible, for example, to use other variants of the system for driving the carriage, such as a belt or a rack; the motor may be a stepping motor or a DC motor.

The detection of the position of the set of shims may also be carried out by treatment of the signal identifying the position of the shims by means of a geometrical mask determined beforehand.

I claim:

1. A method for calibrating an apparatus for measuring a transverse thickness profile of a flat product, said apparatus including a source of radiation, placed on one side of the product, and a row of elementary detectors which are juxtaposed and aligned along a direction of a profile to be measured and are placed on an opposite side of the product, in order to detect that part of the radiation not absorbed by the product, the method comprising the steps of first interposing, between the source and the detectors, standard shims having detectable characteristics and then determining a response of said detectors as a function of the characteristics of these shims, wherein:

a set of different unitary shims of small dimensions, aligned along said direction, are moved between the source and the detectors along said direction, each shim having predetermined specific characteristics, this movement being performed so that each shim intercepts the radiation picked up by each detector, and while said shims are moving, a plurality of readings of signals emitted by the detectors is taken so as to obtain, for each detector, a set of values of signals representing an intensity of the radiation absorbed by each shim, both a speed of movement of the set of shims and a time period between the readings being adjusted so that, for each detector, there is at least one reading of signals relating to each shim, wherein a position of a set of shims with respect to the row of detectors is determined, at a time of each reading, on a basis of the signals read from the row of detectors, and a calibration curve of each detector is established by said set of values.

2. The method as claimed in claim 1, wherein, for each detector, a plurality of readings of the signals relating to the same shim is taken.

3. The method as claimed in claim 1, wherein the position of the set of shims is determined by the position within the row of detectors, of neighboring detectors which, during a reading, supply highly differentiated signals resulting from an abrupt transition in the absorption of the radiation between a predefined one of the set of shims, or of a support for the set of shims.

4. The method as claimed in claim 3, wherein said abrupt transition is produced by a free edge of a frame for supporting the shims which strongly absorbs the radiation, whereas, beyond this edge, the radiation reaches the detectors in its entirety.

5. The method as claimed in claim 1, wherein, each of said readings is taken only when a shim completely covers one of said detectors.

6. A device for calibrating an apparatus for measuring a thickness profile of a flat product, said apparatus including a source of radiation and a row of elementary detectors which are juxtaposed and aligned along a direction of a profile to be measured, the source being placed on one side of a zone for passage of said product and the row of detectors being placed on an opposite side of said zone for passage, wherein said device comprises a set of shims having different characteristics, said shims being aligned along said direction, a carriage for supporting the shims which is movable along said direction in order to move the set of shims into the passage zone so that each shim can intercept the radiation emitted by the source toward each detector, means for taking, while the carriage is moving, a plurality of readings of signals emitted by the detectors so as to obtain, for each detector, a set of values of said signals representing an intensity of the radiation absorbed by each shim, means for determining a position of said shims relative to said row of detectors from signals read from said detectors, and means for determining a calibration curve for each sensor from said values.

7. The device as claimed in claim 6, wherein the shims are supported on the carriage by means of a frame to which the shims are attached in a contiguous manner.

8. The device as claimed in claim 7, wherein an edge of the frame serves as a reference for the determination of the position of the shims with respect to the detectors.

9. A method of calibrating an apparatus for measuring a transverse thickness profile of a flat product, said apparatus including a source of radiation, placed on one side of the product, and a row of elementary detectors which are juxtaposed and aligned along a direction of a profile to be measured and are placed on an opposite side of the product, in order to detect that part of the radiation not absorbed by the product, the method comprising the steps of first interposing, between the source and the detectors, standard shims having detectable characteristics and then determining a response of said detectors as a function of the characteristics of these shims, wherein:

a set of different unitary shims of small dimensions, aligned along said direction, are continuously moved between the source and the detectors along said direction, each shim having predetermined specific characteristics, this movement being performed so that each shim intercepts the radiation picked up by each detector;

periodically determining a position of said set of unitary shims relative to said row of detectors as said shim are continuously moved, and taking a plurality of readings of signals emitted by the detectors while the shims are continuously moved so as to obtain, for each detector, a set of values of signals representing an intensity of the radiation absorbed by each shim, both a speed of movement of the set of shims and timing of the readings being adjusted so that, for each detector, there is at least one reading of signals relating to each shim, and a calibration curve of each detector is established by said set of values.

10. A device for calibrating an apparatus for measuring a thickness profile of a flat product, said apparatus including a source of radiation and a row of elementary detectors which are juxtaposed and aligned along a direction of a profile to be measured, the source being placed on one side of a zone for passage of said product and the row of detectors being placed on an opposite side of said zone for passage, wherein said device comprises a set of shims having different characteristics, said shims being aligned along said direction, a carriage for supporting the shims which is movable along said direction in order to move the set of shims into the passage zone so that each shim can intercept the radiation emitted by the source toward each detector, means for continuously moving said carriage along said direction, means for taking, while the carriage is continuously moved along said direction, a plurality of readings of signals emitted by the detectors so as to obtain, for each detector, a set of values of said signals representing an intensity of the radiation absorbed by each shim, and means for determining a calibration curve for each sensor from said values.

* * * * *